United States Patent [19]

Fletcher et al.

[11] 4,441,155

[45] Apr. 3, 1984

[54] PAGE CONTROLLED CACHE DIRECTORY ADDRESSING

[75] Inventors: Robert P. Fletcher; Daniel B. Martin, both of Poughkeepsie, N.Y.

[73] Assignee: International Business Machines Corporation, Armonk, N.Y.

[21] Appl. No.: 324,165

[22] Filed: Nov. 23, 1981

[51] Int. Cl.³ ............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,723,976 | 3/1973 | Alvarez et al. | 364/200 |
| 3,848,234 | 11/1974 | MacDonald | 364/200 |
| 4,010,451 | 3/1977 | Kibble et al. | 364/200 |
| 4,228,503 | 10/1980 | Waite et al. | 364/200 |
| 4,314,331 | 2/1982 | Porter et al. | 364/200 |
| 4,363,095 | 12/1982 | Woods et al. | 364/200 |

Primary Examiner—Jerry Smith
Assistant Examiner—William G. Niessen
Attorney, Agent, or Firm—Bernard M. Goldman

[57] ABSTRACT

The described embodiment modifies cache addressing in order to decrease the cache miss rate based on a statistical observation that the lowest and highest locations in pages in main storage page frames are usually accessed at a higher frequency than intermediate locations in the pages. Cache class addressing controls are modified to change the distribution of cache contained data more uniformly among the congruence classes in the cache (by comparison with conventional cache class distribution). The cache addressing controls change the congruence class address as a function of the state of a higher-order bit or field in any CPU requested address.

9 Claims, 6 Drawing Figures

PAGE CONTROLLED CACHE DIRECTORY ADDRESSING

BACKGROUND OF THE INVENTION

The invention relates to an improvement in the addressing controls for a processor cache in a data processing system.

DESCRIPTION OF THE PRIOR ART

The most commonly used cache directory found in current commercial computer systems is a hardware matrix in which the matrix rows contain respective cache congruence classes, in which each class has a plurality of associative entries, and each entry is capable of containing a main storage address representation for a line of words in an associated cache data storage array. The directory entries may be conceptually considered to be arranged in the respective columns (i.e. sets) of the matrix. The entries in any row found in the different columns are set-associative.

Each CPU storage requested address (whether virtual or real) is directed to the cache directory. The requested address can be logically divided into a plurality of fields, such as: an external page address field and an internal page address field. The external address field is the high-order part of the requested address and addresses a page frame in main storage, and it requires translation for a virtual address. The remaining low-order part of the requested address is the internal page address field and addresses a byte location within the addressed page.

When a cache is used, at least the internal page address field is subdivided into a congruence class address (CCA) field, a word address field, and a byte address field. The CCA field addresses the cache directory to select a required congruence class. When a required entry is found in the addressed class, a line address is resolved for the cache. Then the word address field locates a word in that cache line, and the byte address field finds the required byte location in the addressed word.

The congruence class address (CCA) field is formed from an internal part of the CPU requested address and comprises K number of consecutive bits providing a line address field within the internal page address field. Congruence class addresses provided for the rows in the cache directory are generally numbered in zero-origin fashion, with a value between 0 and TCC-1, inclusive, in which TCC is the total number of congruence classes in the cache directory. Log TCC (base 2) determines the K number of bits in each CCA. For example, assume a cache directory has 32 congruence classes, four entries in each class, and that each entry can represent the address for a line of 16 doublewords in an associated cache. Each doubleword contains 8 bytes. Thus, the associated cache can contain 16,384 bytes (i.e. $32 \times 4 \times 16 \times 8$). Since the cache directory has 32 rows, each CCA will have five bits (i.e. $\log_2 32$). Therefore, the CCA is a five bit field selected from each requested address, for example, bit positions 20 through 24 in a 32 bit address word. Bit 19 in the request address is the lowest-order bit in the external page address for a 4096 byte page size. Therefore, in any 24 bit address found in a 32 bit position word in the IBM System/370 computers, bit positions 8–19 provide the external page address field, and bit positions 20 through 31 in a requested address provide the internal page address field.

SUMMARY OF THE INVENTION

It is observed that people who use computers must load their program routine or data collection into the computer storage. The loading operation begins each load at address zero of a page in storage, which address is at a page boundary in the computer's real and virtual storage organization. Since there is a great variation in the length of loaded program routines and data collections, their ending locations vary greatly within the pages in storage. Also, the highest address in many pages is commonly used for housekeeping purposes. As a result, the lowest and highest locations in a page are usually used, while intermediate parts of the page often remain unused.

When computers with conventional set-associative caches access pages in their main storage, the cache addressing controls map the requested data line addresses into entries in the cache directory congruence classes in accordance with the CPU requested address. The inventors of this application have found that the most frequently selected cache congruence classes are at class addresses which map near the low and high boundaries of a page, and the frequency of cache class selection generally decreases as the requested addresses deviate away from the lowest and highest addresses toward the intermediate addresses within a page.

This cache class frequency of use characteristic is reflected in the miss rate observed for different congruence classes.

It is a primary object of this invention to provide an improvement in cache class addressing controls which modify the congruence class addresses in a manner that distributes data accessed from storage pages more uniformly among the plurality of the cache congruence classes in order to change the class frequency of use distribution (by comparison with a conventional cache class frequency of use distribution). The more uniform frequency of class use reduces the cache miss rate to correspondingly improve the processor performance.

This invention senses at least the lowest-order bit in the external page address field in the CPU requested address and uses the value of this bit to control the inversion of the second highest-order bit position in a congruence class selection field which is obtained from the high-order part of the internal page address field in the CPU requested address for generating a congruence class address (CCA) that modifies the frequency distribution of class use in a cache directory in accordance with this invention.

EMBODIMENT OF THE INVENTION

Figures 1, 2:
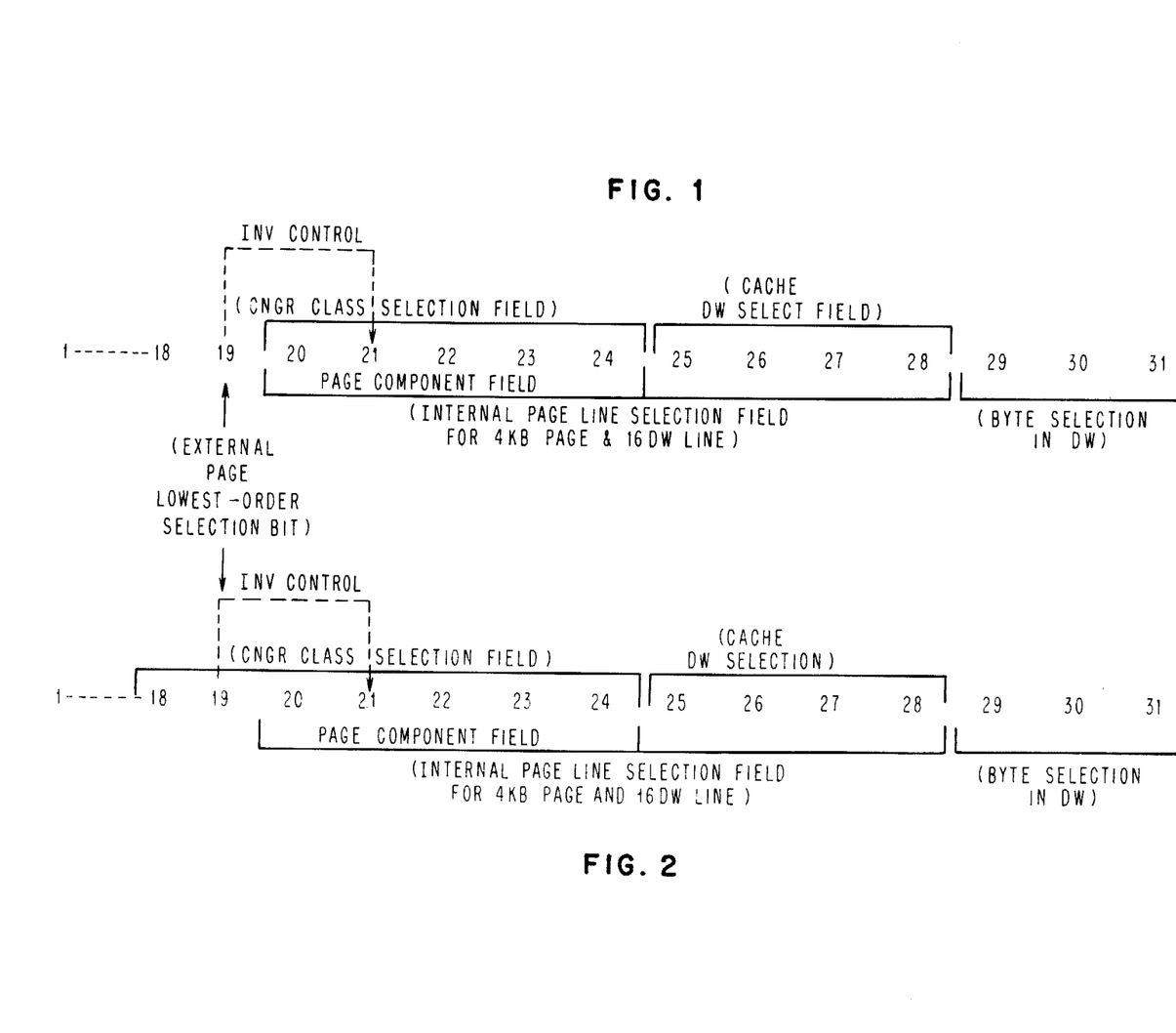
FIGS. 1 and 2 illustrate the fields in a CPU requested address and their relationship to the subject invention.

FIG. 1 represents the fields and their bit positions in a CPU request address for an example of a cache directory with 32 congruence classes which therefore require a five bit position CCA. A group comprised of the six bit positions 19 through 24 (which includes the congruence class selection field comprised of bit positions 20-24) is obtained from a CPU request address in a word comprised of bit positions 0-31, in order to generate the five bit position CCA. The six bit group (19-24) is then manipulated by this invention as follows to generate the five bit CCA:

A. if bit position 19 is 1, bit position 21 is inverted.
B. if bit position 19 is 0, bit position 21 is unchanged.
C. in either case A or B, bit position 19 is then discarded and the resulting five bit positions 20-24 are used as the CCA.

FIG. 2 similarly represents the fields and bit positions in a CPU requested address for another example of a cache directory with 128 congruence classes, and therefore requiring a seven bit CCA comprised of bit positions 18-24 of the CPU requested address. When the bit positions 18, 19 are used from a CPU requested virtual address, ambiguity in synonym class addressing can result in a cache directory which can be resolved in the manner disclosed and claimed in U.S. patent application Ser. No. 130,946 filed Mar. 17, 1980 by B. U. Messina et al, entitled "Cache Synonym Detection And Handling Mechanism" and assigned to the same assignee as the subject application. Application Ser. No. 130,946 uses the synonym effect of bits 18, 19 to divide the cache directory into four synonym groups according to the four permuted values for bit positions 18, 19 in which each synonym group has 32 congruence classes. However, within the resolved synonym group, the congruence class is selected in the same manner as previously described, as follows:

A. if page bit position 19 is 1, invert bit position 21.
B. if page bit position 19 is 0, leave bit position 21 unchanged.
C. In either case A or B, only use bit positions 20-24 to select the required congruence class in the resolved synonym group (e.g. resolved by a principle/synonym hit determination).

The operation of this invention depends on the following rules: The 0 and 1 values of the highest-order internal page address bit (e.g. bit position 20) divide a page location into upper and lower halves. The 0 and 1 values of the second highest-order internal page address bit (e.g. bit position 21) divides the respective half of a page (determined by the value of bit position 20) into upper and lower quarters of a page, respectively (i.e. complementary quarters). It also follows that the 0 and 1 values of the third highest-order internal page address bit (e.g. bit position 22) divides the respective quarter of a page (determined by the values of bit positions 20, 21) into upper and lower one-eighths of a page. Each subsequently lower-order bit position will therefore divide a respectively smaller page portion into upper and lower halves.

Therefore by inverting only the second-highest internal page address bit position (e.g. 21), the resulting CCA (which depends on internal page address bit positions 20-24) can relocate in the cache directory to another CCA found in the complementary quarter of the page.

Since the subject invention is based on a statistical discovery that the internal page address use pattern derived from computer job streams shows the highest use frequency of lines to be at the lower and upper addresses in the average page and the lowest use frequency in the intermediate addresses, the invention implements the quarter page inversion by inverting the second highest-order internal page addressing bit position (e.g. 21) as the most effective bit position for controlling the redistribution of storage references among the congruence classes in a more uniform manner to obtain a more even statistical frequency of use of all the different classes in the cache directory and thereby reduce the frequency of cache misses. Furthermore, the inventors have also discovered in their statistical experimentation that an effective way to control the quarter page redistributions by the second-highest order internal page address bit position is to use the value of the lowest-order external page address bit position (e.g. 19), since it changes more often than any higher-order bit used to address a page in storage. The experimental conclusion was therefore to use the value of the lowest-order external page address bit position (e.g. 19), to control the inverting of the second highest-order internal page address bit position (e.g. 21).

Other internal page address bit positions (e.g. 20 and/or 22) therefore are expected, on the average, to provide less significant congruence class use redistribution refinements.

Other external page address bit positions (e.g. 18 and/or 17) may also be used in addition to the lowest-order bit position (e.g. 19) to provide less significant class-redistribution refinements, for example, by exclusive-ORing them so that the internal page second-order bit is inverted whenever any of the selected external page bits changes to a one state.

Figure 3:
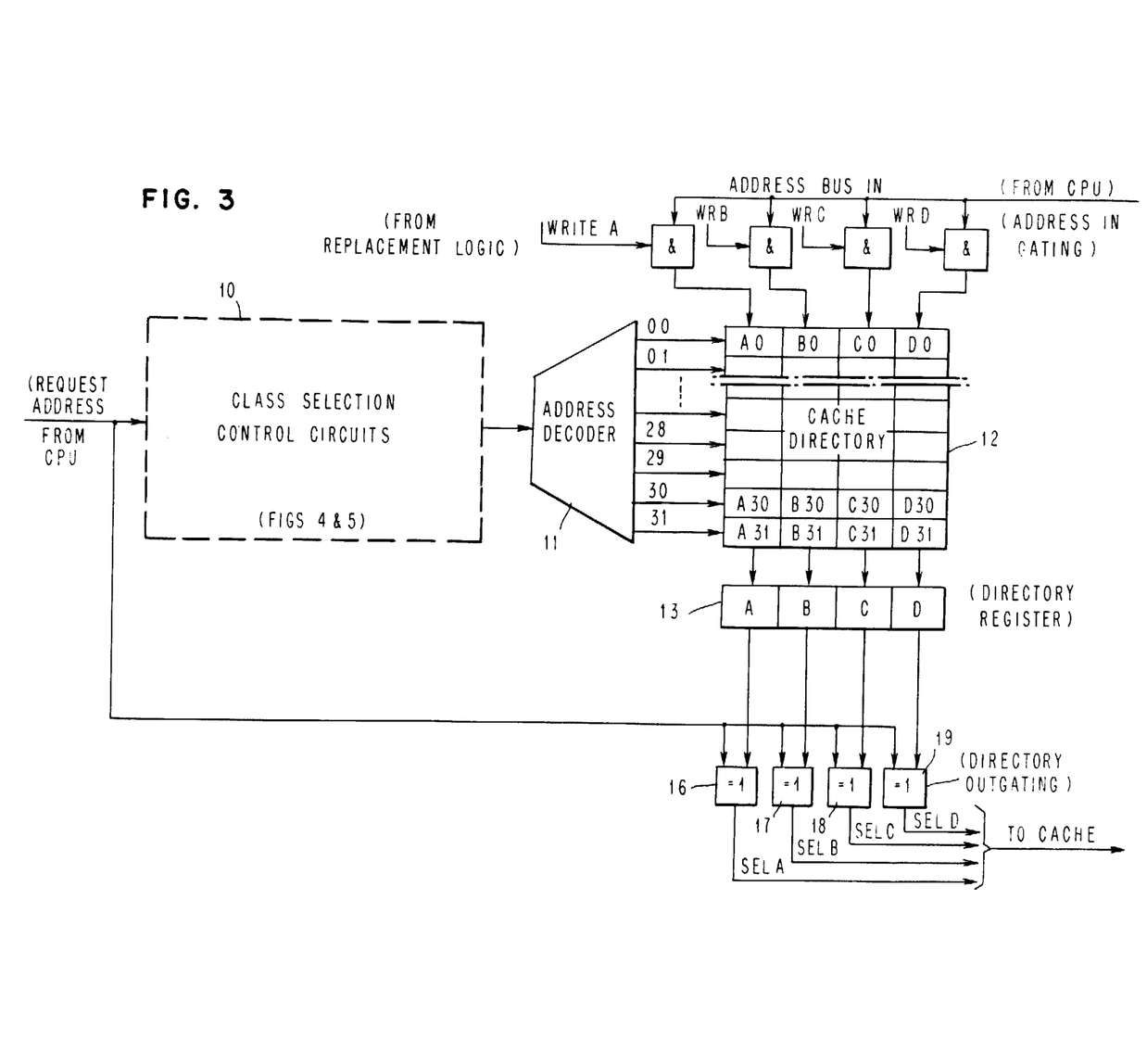
FIG. 3 shows how the invention is located in an otherwise conventional cache directory arrangement.
Figure 4:
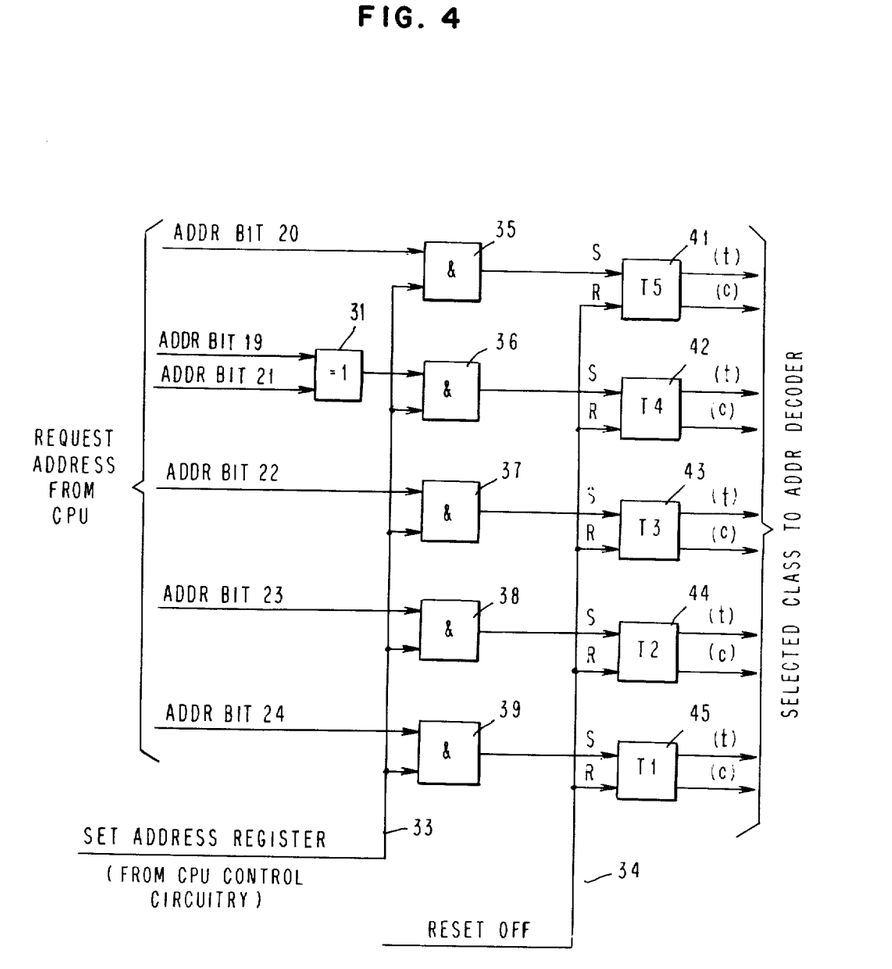
FIGS. 4 and 5 illustrate alternative implementations of the invention.
Figure 5:
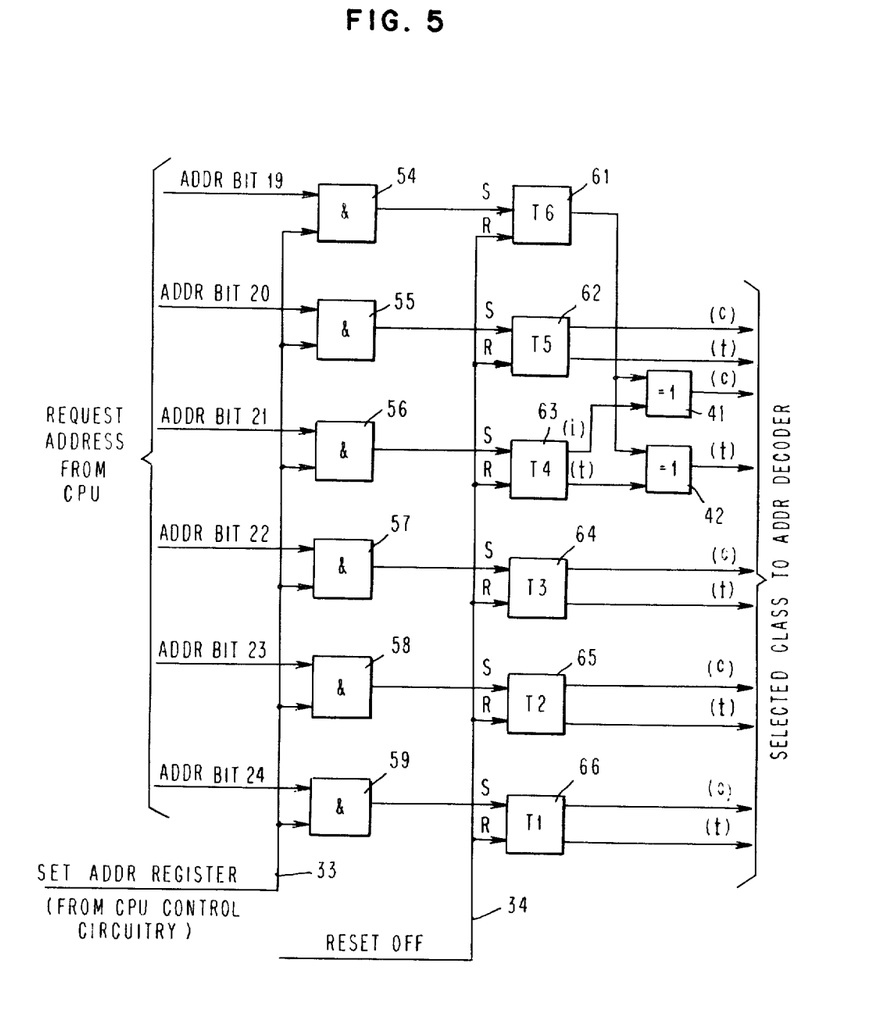

The preferred embodiments in FIGS. 3-5 shows only the preferred second highest-order page address bit position 21 being controlled by the lowest-order external page address bit position 19, in order to minimize hardware and timing problems which can result in different path length delays within the cache addressing circuits which are critical to obtaining fast cache performance.

TABLE 1 below shows the results of a statistical study of a sequence of program runs simulating both: (1) a CPU having this invention embodied in a cache arrangement as disclosed in FIG. 3, and (2) a CPU with an identical cache not having this invention.

In TABLE 1, column CCA indicates all of the cache's congruence class addresses in hexadecimal numbers. The results with the invention are represented in column ICCA, which shows the proportion % of cache misses in each congruence class when using the invention. The results with the conventional cache (not having this invention), are represented in column CCCA which shows the proportion % of cache misses for its respective congruence classes.

TABLE 1

| CCA | CCCA % of MISSES | ICCA % of MISSES | % CHANGE |
|---|---|---|---|
| 00 | 6.3 | 5.9 | −0.4 |
| 01 | 5.0 | 4.3 | −0.7 |
| 02 | 3.1 | 2.7 | +0.4 |
| 03 | 2.4 | 1.8 | +0.6 |
| 04 | 3.0 | 1.8 | +1.2 |
| 05 | 3.4 | 2.7 | +0.1 |
| 06 | 4.7 | 3.1 | −1.6 |
| 07 | 4.3 | 3.2 | −1.1 |
| 08 | 2.6 | 3.5 | −0.1 |
| 09 | 3.0 | 3.6 | −0.4 |
| 0A | 2.3 | 2.8 | −0.5 |
| 0B | 1.6 | 2.3 | −0.7 |
| 0C | 1.2 | 2.1 | −0.9 |
| 0D | 2.2 | 2.9 | −0.7 |
| 0E | 2.6 | 3.4 | −0.2 |

TABLE 1-continued

| CCA | CCCA % of MISSES | ICCA % of MISSES | % CHANGE |
| --- | --- | --- | --- |
| 0F | 2.5 | 3.4 | −0.3 |
| 10 | 2.4 | 2.7 | −0.3 |
| 11 | 2.7 | 3.5 | 0 |
| 12 | 2.7 | 3.4 | −0.1 |
| 13 | 2.5 | 3.8 | +0.1 |
| 14 | 3.0 | 3.6 | +0.4 |
| 15 | 2.8 | 3.6 | +0.2 |
| 16 | 3.3 | 3.6 | +0.3 |
| 17 | 2.7 | 3.8 | +0.3 |
| 18 | 3.9 | 3.6 | −0.3 |
| 19 | 3.6 | 2.9 | −0.3 |
| 1A | 3.1 | 2.6 | +0.5 |
| 1B | 3.3 | 2.3 | +0.6 |
| 1C | 2.9 | 2.1 | +0.8 |
| 1D | 3.7 | 3.2 | −0.5 |
| 1E | 3.3 | 2.9 | 0 |
| 1F | 4.1 | 2.9 | −0.8 |
|  |  |  | −3.6 |

An eye comparison of columns ICCA and CCCA in TABLE 1 shows a more uniform cache miss rate among the cache congruence classes addressed by this invention than addressed in the conventional manner. It is apparent in TABLE 1 that the invention is able to redirect some of the cache references from the lower and higher address classes into the middle address classes, resulting in a class traffic contour for this invention which is a closer approximation to the ideal traffic pattern of obtaining an equal number of cache misses among all the classes, i.e. 3.125% cache misses at every class address. If the number of misses were the same in all congruence classes, the percentage would be 100% divided by TCC. That is, the average percent of misses for each congruence class in TABLE 1 is 3.125% (i.e. 100 divided by 32).

The difference between the deviations of ICCA and CCCA from the rounded average % of misses, 3.1%, is shown in the column, % CHANGE, which indicates the net deviation gain (+) or loss (−) for the corresponding congruence classes. The net deviation for all 32 congruence classes in the cache indicates that the invention obtains a 3.6% decrease in cache misses which results in a correspondingly significant improvement in CPU performance for a very small increase (i.e. much less than 3.6%) in hardware costs to incorporate the subject invention into a cache directory in a CPU being manufactured.

Figure 6:
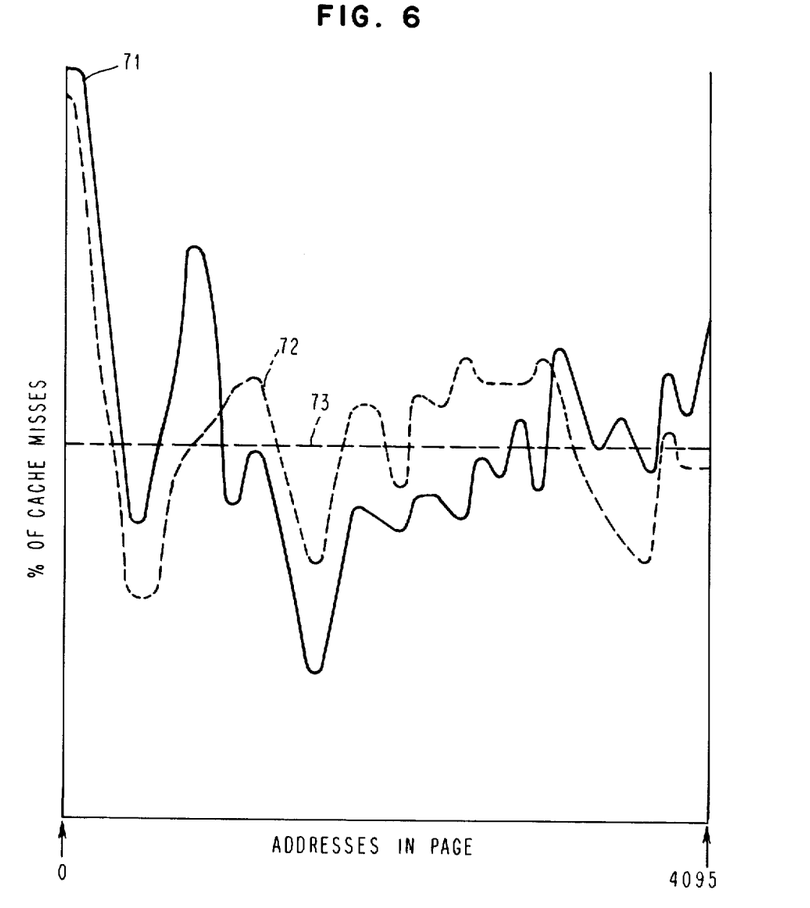
FIG. 6 illustrates the request misses in the congruence classes of a cache without and with the invention.

Profile 71 in FIG. 6 shows the typical distribution of cache misses as a function of the congruence class addresses (CCAs) in a conventional cache directory. Profile 72 shows a typical distribution of the cache misses as a function of the CCAs in a cache directory having this invention. A visual comparison of profiles 71 and 72 shows that the invention obtains a more uniform distribution (i.e. closer to average profile 73) than the conventional cache. The more uniform distribution results in a reduction in cache misses which improves processor performance.

FIG. 3 illustrates a cache directory hardware arrangement which contains the method provided by the subject invention in its class selection control circuits 10, that may be constructed as shown in either FIG. 4 or FIG. 5. Circuits 10 receive a requested logical address provided from a CPU (not shown).

A congruence class address (CCA) is outputted from circuits 10 to conventional cache directory circuits, such as to a conventional type of address decoder 11 for a set-associative cache directory 12 which are shown for the purpose of illustrating how the cache addressing circuits 10 containing the invention connect to cache circuits which may be conventional. Accordingly, the output of circuit 10 selects one of 32 congruence classes having class addresses 0–31 in cache directory 12. Each congruence class contains four entries A, B, C, and D. All four entries in any selected congruence class are examined associatively, and this type of cache directory is commonly called set-associative. A conventional directory register 13 receives the four set-associative entries in any selected congruence class in cache directory 12. Conventional directory compare logic (not shown) compares the four entries A, B, C, and D in register 13 with a translated absolute address corresponding to the CPU requested logical address. The results of this compare enables one of exclusive-OR circuits 16, 17, 18 or 19 in the conventional manner to select one of the set addresses A, B, C, or D and output it to the associated cache to select the proper line of data in the addressed class. The requested doubleword (DW) in the selected cache line is addressed by the cache DW selection field derived from the CPU requested logical address. The CPU will use the byte selection field to obtain the required byte location in the DW.

FIGS. 4 and 5 respectively illustrate two embodiments of the subject invention. Each embodiment receives a part of the CPU requested logical address, i.e. address bits 19–24. Also, each embodiment in FIG. 4 or 5 provides a congruence class address (CCA) which is provided to address decoder 11 in FIG. 3.

The choice between the embodiments in FIG. 4 or 5 depends on the time delay skew for the address bits in the cache congruence class address outputted from circuits 10 in FIG. 3 in a particular cache design. The path having the longest delay in the design is sometimes known as the "critical path". The embodiment in FIG. 4 is preferable if an exclusive-OR circuit 31 provided for this invention is not in the critical path. However, if exclusive-OR circuit 31 should be in the critical path of a particular cache directory design, then the alternative circuitry provided by in FIG. 5 is preferable, since it places circuits provided by this invention in other path relationships by providing exclusive-OR circuits 41 and 42 on the output side of a congruence class address register.

In FIG. 4, an exclusive-OR circuit 31 receives logical address bit positions 19 and 21 and its output is connected to an AND gate 36. AND gates 35, 37, 38 and 39 respectively receive logical address bits 20, 22, 23, and 24. Gates 35–39 gate them to set inputs of triggers 41–45 (comprising a CCA register) when a set signal is received from the CPU on a line 33. The true (t) and complementary (c) outputs of triggers 41–45 provide the CCA bits to the address decoder 11 in FIG. 3 to select a congruence class. Triggers 41–45 are reset by a CPU signal on a line 34.

The alternative embodiment in FIG. 5 provides exclusive-OR circuits 41 and 42 on the output side of the CCA register comprising triggers 61–66 which receive set inputs representing bit positions 19–24 from AND gates 54–59. Thus, the CCA register respectively receives request address bits 19–24. The CPU provides a reset signal to the reset line 33 for resetting the congruence class register 41–45 or 61–66 when the next CPU request is going to be provided. Exclusive-OR circuit 41 generates the complement signal for CCA bit position 21 and exclusive-OR circuit 42 generates the true signal for CCA bit position 21 in the outputted CCA address provided to the address decoder 11.

By assigning cache lines from odd and even portions of the different congruence classes, a reduction in misses on lines at each end of the page is achieved. Even though some of the lines from the middle of the page experience more misses, the total cache misses are reduced resulting in higher processor performance. In a typical commercial application as shown in FIG. 6 which represents the information in TABLE 1, this processor cache utilization improvement was −3.6%, which means that the processor with this invention completed execution of a particular program instruction stream with 3.6% less deviation from the theoretically ideal perfectly uniform distribution of cache misses. The consequence of an improved cache utilization is a corresponding improvement in program execution time.

While the invention has been particularly shown and described with references to plural embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of modifying the addressing of a cache directory with a virtual addres requested by a CPU for accessing a page frame in main storage, the virtual address including an external page address field and an internal page address field, the external page address field being used for addressing the page frame in main storage, a page component field at the high-order end of the internal page address field, a congruence class selection field being taken from the virtual address and including the page component field, the modified cache addressing method comprising the steps of:
   selecting a group of contiguous bit positions from the requested virtual address including at least the congruence class selection field and a control bit position which is the lowest-order bit position in the external page address field,
   inverting the content of a sub-page bit position in the page component field of the congruence class selection field when the control bit position has one state and not changing the content of the sub-page bit position when the control bit position has another state,
   addressing the cache direction with a modified congruence class selection field derived by the inverting step being applied to the congruence class selection field obtained by the selecting step,
   whereby improved cache utilization can be obtained by the inverting step redistributing the congruence classes in the cache directory.

2. A method as defined in claim 1, the modified cache addressing method having the sub-page bit position located at the second highest-order bit position in the page component field.

3. A method as defined in claims 1 or 2, the modified cache addressing method further comprising:
   executing the inverting step in hardware-circuit paths to cache directory addressing circuits with addressing bits provided by the inverting step having a propagation delay to the cache directory not significantly greater than other bits in the modified congruence class selection field,
   whereby the cache directory speed of operation is not affected by the cache addressing method.

4. A method as defined in claim 3, the modified cache addressing method further comprising:
   finding a propagation delay for each hardware-circuit to the cache directory addressing circuits for each bit position in the modified congruence class selection field obtained by the selecting step to determine the relative propagation times for the respective hardware-circuit paths,
   shortening the propagation time of the hardware-circuits for each bit position provided by the inverting step if the finding step finds the propagation delay for the bit position provided by the inverting step to be longer than a path delay for other bit positions in the modified congruence class selection field.

5. A method as defined in claim 2, the modified cache addressing method further comprising:
   setting bistable devices to the states of the bit positions in the congruence class selection field,
   providing the inverting step on an output side of the bistable devices for generating the modified congruence class selection field.

6. A method as defined in claim 5, the inverting step further comprising:
   exclusive-ORing the control bit position and the second highest-order bit position in the congruence class selection field selected by the selecting step to provide the inverting step on an input side of a register that receives the modified congruence class selection field.

7. Means for addressing a cache directory with a virtual address requested by a CPU for accessing a page frame in main storage, the virtual address including an external page address field and an internal page address field, the external page address field being used for addressing the page frame in main storage, a page component field at the high-order end of the internal page address field, a congruence class selection field being taken from the virtual address and including the page component field, cache addressing means for providing a modified congruence class address field comprising:
   gate circuits for selecting a group of contiguous bit positions from the requested virtual address including at least the congruence class selection field and a control bit position which is the lowest-order bit position in the external page address field,
   inverter means for receiving and inverting a sub-page bit position in the page component field of the congruence class selection field when the control bit position has a one state and not changing the sub-page bit position when the control bit position has a zero state,
   means for addressing the cache directory with a modified congruence class address generated by the inverting means modifying the congruence class selection field to provide the modified congruence class address,
   whereby improved cache utilization is obtained by accessing the cache directory with modified congruence class addresses.

8. Cache directory addressing means as defined in claim 7, the inverter means receiving and inverting a sub-page bit position which is the second highest-order bit position in the page component field.

9. Cache directory adressing means as defined in claim 8, the inverter further comprising:
an exclusive-OR circuit receiving the control bit position and the second highest-order bit position to generate the second-highest order bit position in the modified congruence class address having other bit positions the same as in the congruence class selection field.

* * * * *